No. 840,436. PATENTED JAN. 1, 1907.
E. W. COOKE.
PROCESS OF DEHYDRATING FOOD SUBSTANCES.
APPLICATION FILED FEB. 24, 1904.
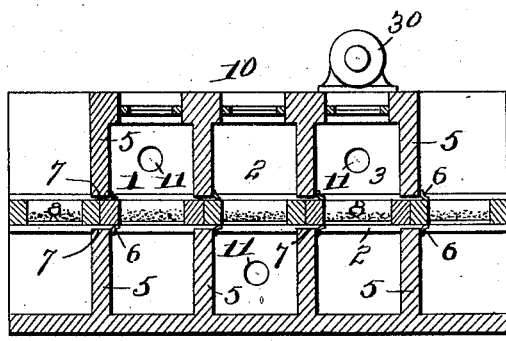
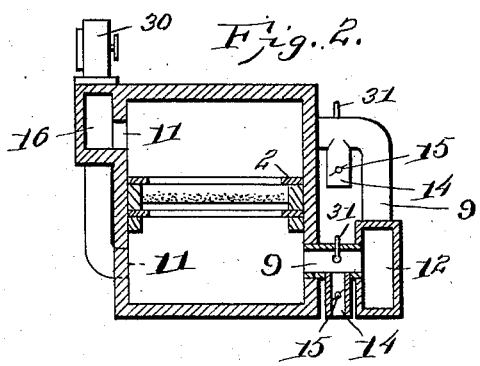
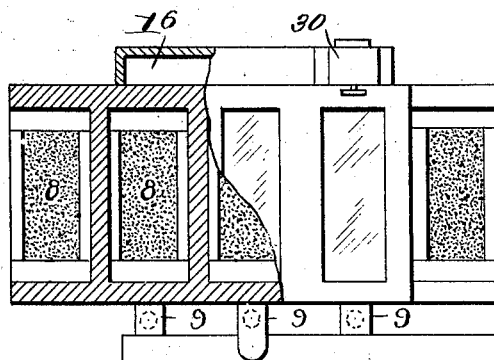
Witnesses
L. Armstrong
Robert Watson
Inventor
Ernest W. Cooke,
By Howard A. Coombs
Attorney

UNITED STATES PATENT OFFICE.

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

PROCESS OF DEHYDRATING FOOD SUBSTANCES.

No. 840,436.     Specification of Letters Patent.     Patented Jan. 1, 1907.

Application filed February 24, 1904. Serial No. 195,545.

*To all whom it may concern:*

Be it known that I, ERNEST WILLIAM COOKE, a citizen of the United States, residing at New York city, in the county of New York and State of New York, have invented certain new and useful Improvements in Processes of Dehydrating Food Substances, of which the following is a specification.

My invention relates to a process of dehydrating animal and vegetable substances, and has for its object more particularly the dehydration of food products in such a way that the internal structure thereof is uninjured and so that they can be perfectly restored to their original undehydrated condition by the simple addition of water. In order to accomplish this result, I have discovered that it is essential in the treatment of some products at least to pass through the same, first from one side and then from the other, independent currents of air or other vaporous gas of different temperature and humidity.

It is only by reversing the direction in which the independent currents of air or gas strike the products and by subjecting them alternately—for example, to a current of hot air and to a current of cool air—that certain substances can be dehydrated so as to abstract the moisture only and leave them in condition to be restored by the simple addition of water so perfectly that they cannot be distinguished from fresh products.

Hereinafter I will for convenience use the term "air" as a generic term including any kind of vapor or gas, as well as atmospheric air, which is suitable for the purpose.

The apparatus in which the above-described process may be carried out is shown in the accompanying drawings, in which—

Figure 1 is a longitudinal vertical section through the apparatus. Fig. 2 is a transverse section through the apparatus. Fig. 3 is a plan view of the same, partly broken away.

In said figures, 10 represents the dehydrating-chamber as a whole, the same being divided into sections 1 2 3, &c., by transverse partitions 5, in which are transverse apertures 7 of substantially the size of the trays 8, on which the material to be dehydrated is placed, preferably, in a more or less finely-divided state. The distance between adjacent partitions 5 is equal to an integral multiple of the length of the trays, so that when the trays are stopped the ends of a pair of adjacent trays always come in line with each partition. The edges of the apertures 7 are provided with packing-strips 6, which contact with the ends of the trays, as shown, to make a substantially air-tight joint. The trays, which move on guideways 2, may be pushed through the chamber or they may be provided with means to attach them to each other and be drawn through.

Each of the sections 1 2 3, &c., is provided with an air-inlet 9 and an air-outlet 11, which alternates between that part of the section above the path of the trays and that part below the same. In other words, the air-inlets 9 of the sections 1 and 3 are in the lower half of said sections and the air-outlets 11 are in the upper half, while the air-inlet 9 of the section 2 is in the upper half of said section, and the air-outlet 11 is in the lower half.

The outlets 11 lead into a duct 16, running along the side of the chamber and communicating at one end with a fan or blower 30, which draws the air through the apparatus. Of course the air may be blown through instead without departing from my invention.

31 represents a thermometer in the air-inlets, and other thermometers and also hygrometers (not shown) are preferably employed, so that the condition of the entering and leaving currents or air may be readily ascertained.

Various modifications in construction of the apparatus may obviously be made within the scope of my invention, which is set forth in the following claims.

I claim—

1. The process of dehydrating food substances, which consists in passing therethrough a current of air of a certain temperature and humidity and immediately thereafter passing therethrough in the opposite direction an independent current of air of a different temperature and humidity.

2. The process of dehydrating food substances, which consists in inclosing them in a receptacle divided into substantially air-tight sections, passing currents of air of a certain temperature and humidity through alternate sections in one direction, passing independent currents of air of a different temperature and humidity through the intervening sections in the opposite direction and intermittently moving the substances forwardly through the receptacle.

3. The process of dehydrating food substances, which consists in alternately forcing therethrough in opposite directions independent currents of air of different temperatures and humidity.

In testimony whereof I affix my signature in presence of two witnesses.

ERNEST WILLIAM COOKE.

Witnesses:
 WALTER M. JACKSON,
 H. HAUPT, Jr.